(12) United States Patent
Park (10) Patent No.: US 11,892,883 B2
(45) Date of Patent: Feb. 6, 2024

(54) DISPLAY DEVICE WITH FRICTION HINGE

(71) Applicant: Microsoft Technology Licensing, LLC, Redmond, WA (US)

(72) Inventor: Daniel C. Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 17/233,882

(22) Filed: Apr. 19, 2021

(65) Prior Publication Data

US 2022/0334619 A1  Oct. 20, 2022

(51) Int. Cl.
G06F 1/16 (2006.01)

(52) U.S. Cl.
CPC .......... *G06F 1/1681* (2013.01); *G06F 1/1647* (2013.01); *G06F 1/1616* (2013.01)

(58) Field of Classification Search
CPC .... G06F 1/1681; G06F 1/1647; G06F 1/1616; G06F 1/1618; G06F 1/1683; E05D 11/082; E05D 3/122; H04M 1/022
See application file for complete search history.

(56) References Cited

U.S. PATENT DOCUMENTS

| | | | |
|---|---|---|---|
| 5,874,696 A | 2/1999 | Hayashi et al. | |
| 7,512,426 B2 | 3/2009 | Maatta et al. | |
| 7,631,410 B2 | 12/2009 | Schlesener et al. | |
| 7,765,644 B2 | 8/2010 | Sakai | |
| 8,982,542 B2 | 3/2015 | Bohn | |
| 9,342,101 B2 | 5/2016 | Hsu | |
| 9,625,952 B2 | 4/2017 | Holung et al. | |
| 9,857,849 B1 * | 1/2018 | Siddiqui | G06F 1/1618 |
| 9,891,670 B2 | 2/2018 | Kim et al. | |
| 10,013,021 B2 | 7/2018 | Matsuoka | |
| 10,024,092 B1 | 7/2018 | Tanner et al. | |
| 10,296,044 B2 | 5/2019 | Siddiqui et al. | |

(Continued)

FOREIGN PATENT DOCUMENTS

| | | |
|---|---|---|
| CN | 109949707 A | 6/2019 |
| CN | 110166591 A | 8/2019 |

(Continued)

OTHER PUBLICATIONS

"Non Final Office Action Issued in U.S. Appl. No. 17/104,595", dated Sep. 2, 2022, 10 Pages.

(Continued)

*Primary Examiner* — James Wu
(74) *Attorney, Agent, or Firm* — Rainier Patents, P.S.

(57) ABSTRACT

The description relates to hinged devices, such as hinged computing devices. One example can include a first portion having a first display surrounded by a first bezel and a second portion having a second display surrounded by a second bezel. A hinge assembly can rotatably secure the first and second portions. The hinge assembly can include a first friction band that is secured to the first portion and is friction fit around a first hinge shaft, and a second friction band that is secured to the second portion and is friction fit around a second hinge shaft. The first friction band and the first hinge shaft are located entirely within the first bezel and do not underly the first display, and the second friction band and the second hinge shaft are located entirely within the second bezel and do not underly the second display.

4 Claims, 11 Drawing Sheets

(56) References Cited

U.S. PATENT DOCUMENTS

| | | |
|---|---|---|
| 10,345,866 B2 | 7/2019 | Tucker et al. |
| 10,429,903 B2 | 10/2019 | Hong et al. |
| 10,488,882 B2 | 11/2019 | Maatta et al. |
| 10,633,899 B2 | 4/2020 | Eshuis |
| 10,905,020 B2 | 1/2021 | Jan et al. |
| 10,931,070 B1 * | 2/2021 | Files .................... H01R 24/40 |
| 11,091,944 B2 | 8/2021 | Siddiqui et al. |
| 11,106,248 B2 | 8/2021 | Campbell et al. |
| 11,194,366 B2 | 12/2021 | Cheng |
| 2012/0120618 A1 | 5/2012 | Bohn |
| 2014/0360296 A1 | 12/2014 | Hsu |
| 2017/0357294 A1 | 12/2017 | Siddiqui et al. |
| 2018/0049336 A1 | 2/2018 | Manuel et al. |
| 2018/0067520 A1 | 3/2018 | Maatta et al. |
| 2018/0356858 A1 | 12/2018 | Siddiqui et al. |
| 2019/0166703 A1 | 5/2019 | Kim et al. |
| 2019/0301215 A1 | 10/2019 | Siddiqui et al. |
| 2020/0117233 A1 | 4/2020 | Ou et al. |
| 2020/0236801 A1 | 7/2020 | Jan et al. |
| 2020/0326756 A1 | 10/2020 | Siddiqui et al. |
| 2020/0363843 A1 | 11/2020 | Cheng |
| 2022/0026959 A1 * | 1/2022 | Moon .................... G06F 1/1643 |
| 2022/0035419 A1 | 2/2022 | Park et al. |

FOREIGN PATENT DOCUMENTS

| | | |
|---|---|---|
| CN | 111131568 A | 5/2020 |
| JP | 2001262747 A | 9/2001 |
| KR | 20190077292 A | 7/2019 |
| WO | 2008100013 A1 | 8/2008 |
| WO | 2016140524 A1 | 9/2016 |
| WO | 2019134695 A1 | 7/2019 |

OTHER PUBLICATIONS

"International Search Report & Written Opinion issued in PCT Application No. PCT/US22/022976", dated Jul. 13, 2022, 11 Pages.

"International Search Report and Written Opinion Issued in PCT Application No. PCT/US21/030765", dated Jul. 26, 2021, 15 Pages.

"Notice of Allowance Issued in U.S. Appl. No. 17/104,595", dated Feb. 21, 2023, 9 Pages.

* cited by examiner

DISPLAY DEVICE WITH FRICTION HINGE

BACKGROUND

Many computer form factors such as smart phones, tablets, and notebook computers can provide enhanced functionality by folding for storage and opening for use. For instance, the folded device is easier to carry and the opened device offers more input/output area. Many hinge designs have been tried. However, hinges that are durable while occupying minimal device real estate have been difficult to achieve. The present concepts relate to these and other aspects.

SUMMARY

The description relates to hinged computing devices. One example can include a first portion having a first display surrounded by a first bezel and a second portion having a second display surrounded by a second bezel. A hinge assembly can rotatably secure the first and second portions. The hinge assembly can include a first friction band that is secured to the first portion and is friction fit around a first hinge shaft, and a second friction band that is secured to the second portion and is friction fit around a second hinge shaft. The first friction band and the first hinge shaft are located entirely within the first bezel and do not underly the first display, and the second friction band and the second hinge shaft are located entirely within the second bezel and do not underly the second display.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions. Many of these devices include displays on the first and/or second portions that are surrounded by narrow bezels. The hinge assemblies can provide resistance to rotation (e.g., friction) to maintain the device in an orientation set by the user. The friction can be provided by friction bands. The present concepts relate to narrow friction bands that can be positioned in the bezel of the device rather than being positioned under the displays. In order to provide relatively high friction in the relatively little available space (e.g., device real estate), the friction bands can have a thickness equivalent to a thickness of the device portions. These and other aspects are described below.

Figure 1:
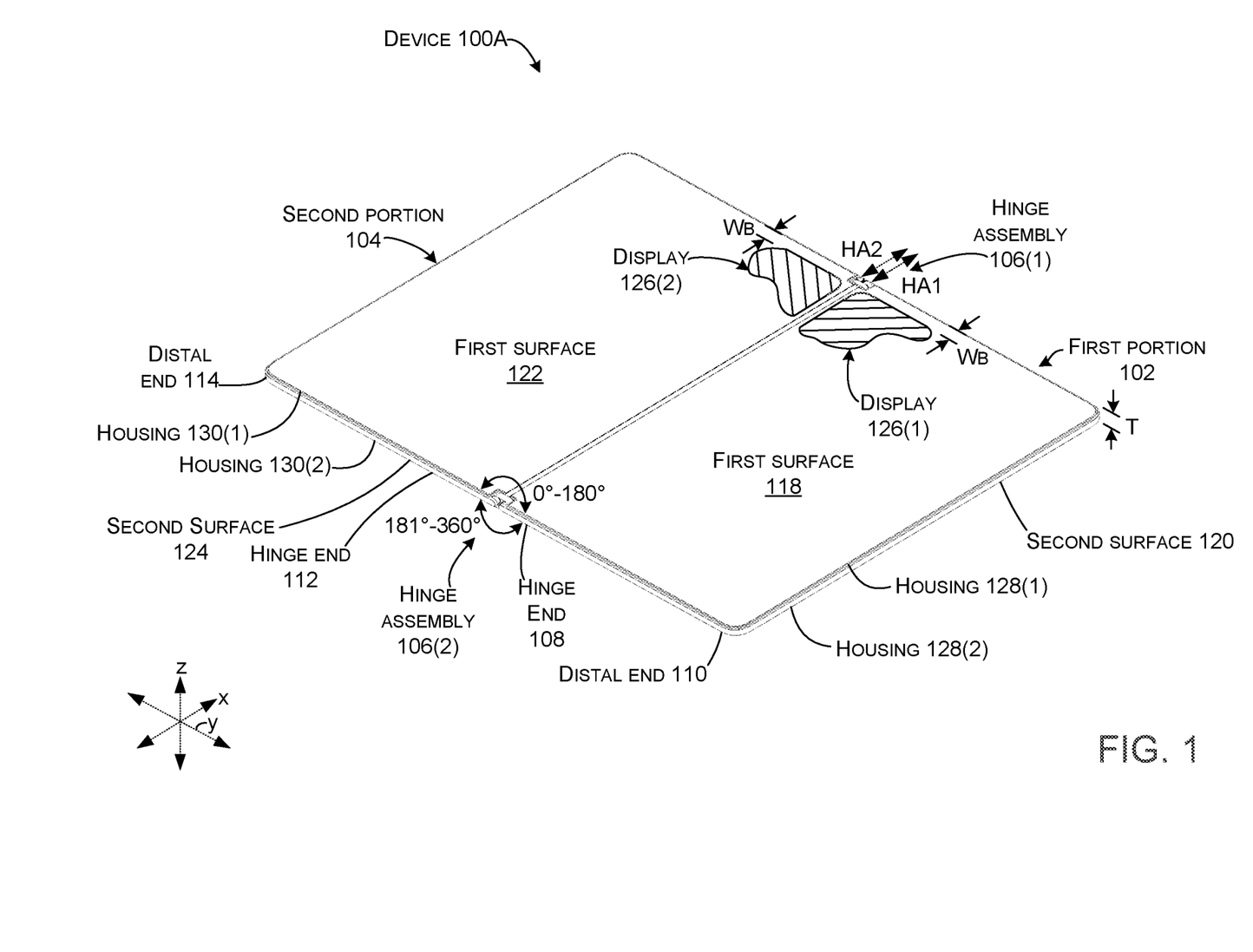
FIGS. 1, 2A, 2B, and 3A show perspective views of example devices in accordance with some implementations of the present concepts.

Introductory FIG. 1 shows an example device 100A that has first and second portions 102 and 104 that are rotatably secured together by hinge assemblies 106 through a range of orientations, such as zero degrees to 360 degrees. (The use of a suffix, e.g., 'A' with the designator 100, is intended to indicate that elements of the various described devices 100 may be the same or different). In the illustrated implementation, two hinge assemblies 106(1) and 106(2) are employed, but other implementations could employ a single hinge assembly or more than two hinge assemblies.

The first portion 102 can extend from a hinge end 108 to a distal end 110. The second portion 104 also can extend from a hinge end 112 to a distal end 114. The hinge assemblies 106 can define two hinge axes HA. The first portion 102 can rotate around first hinge axis HA1 and the second portion 104 can rotate around second hinge axis HA2. The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view).

Figure 2A:
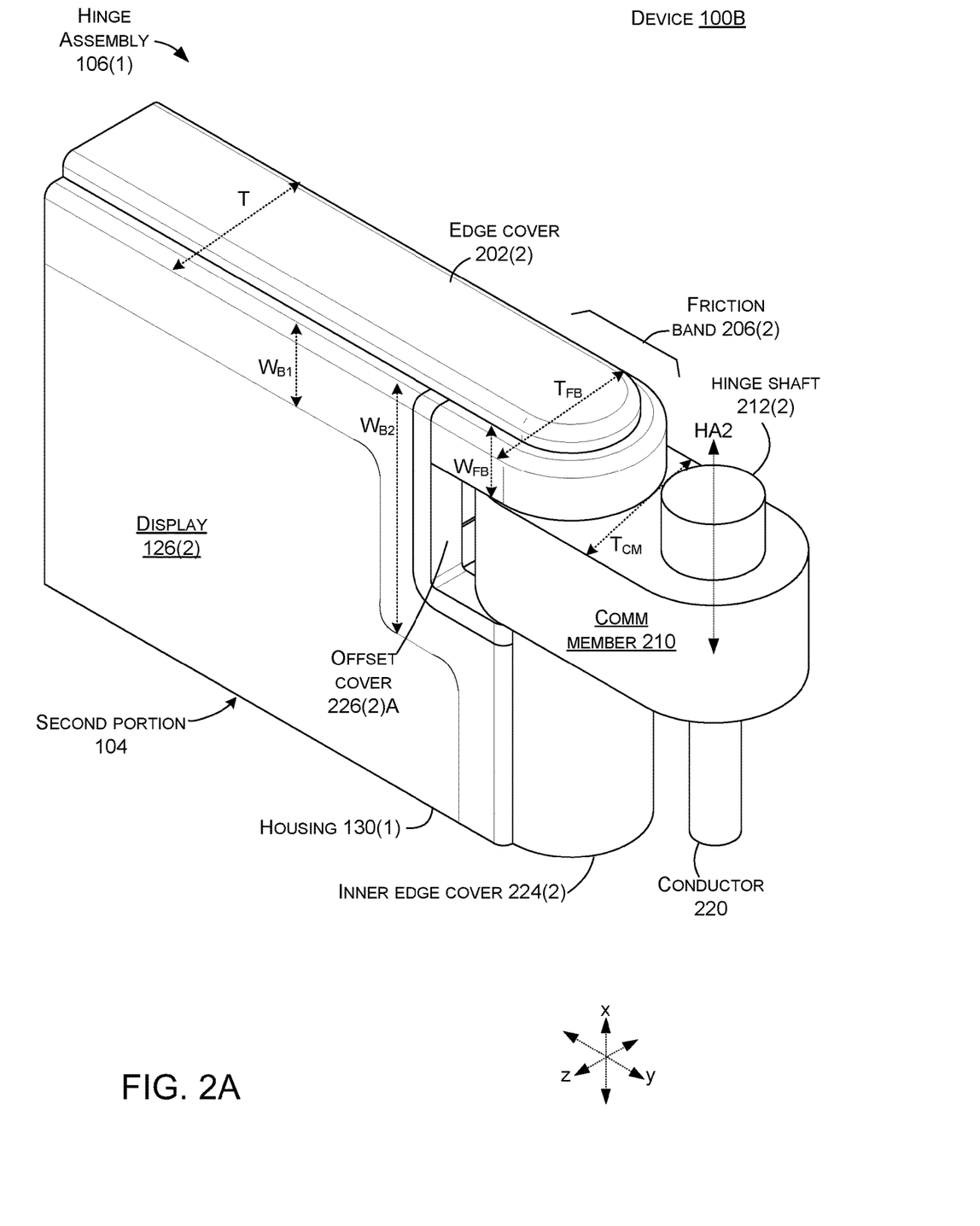

In some implementations, the device can include housing 128 associated with the first portion 102 and housing 130 associated with the second portion 104. Housing 128(1) can define the first surface 118 and housing 128(2) can define second surface 120. Similarly, housing 130(1) can define first surface 122 and housing 130(2) can define second surface 124. The displays 126 can be supported by housing 128 and/or housing 130. For example, the displays 126 can be positioned on the first and/or second surfaces 118, 120, 122, and/or 124, respectively. In the illustrated configuration, the displays 126 are positioned on first surfaces 118 and 122, respectively. Consumer demand dictates that the displays 126 cover as much of the surfaces as possible (e.g., the bezel width WB is narrow). FIG. 2A shows an alternative bezel configuration where the displays 126 are notched around the hinge assembly 106.

The hinge assemblies 106 can satisfy various design parameters, such as providing friction to maintain the device in a given orientation. For instance, if the user places the device in a 100-degree orientation, the friction provided by the hinge assemblies can maintain that orientation until the user changes it. As mentioned above, many device designs attempt to produce a thin device. The present hinge assembly concepts can provide hinge assemblies 106 that satisfy design parameters related to device thickness T in the z reference direction while providing sufficient friction. For instance, elements of the hinge assembly that provide the friction can occur in the bezel rather than underlying the displays. This configuration can provide both relatively high friction and device thinness. These aspects are described in more detail below relative to FIGS. 2A-3H.

FIGS. 2A-3H collectively illustrate several example implementations of the present concepts.

Figure 2B:
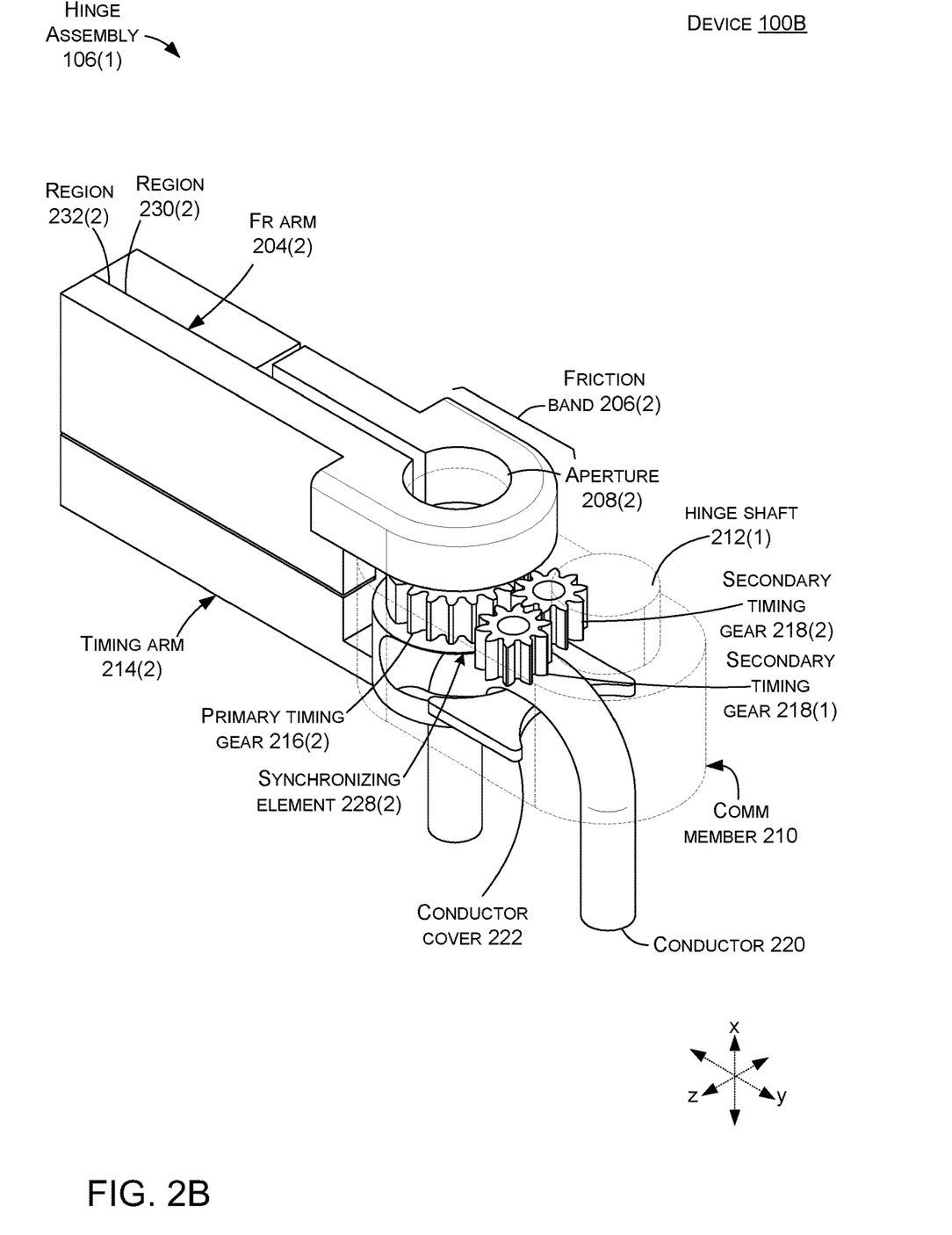
Figure 2C:
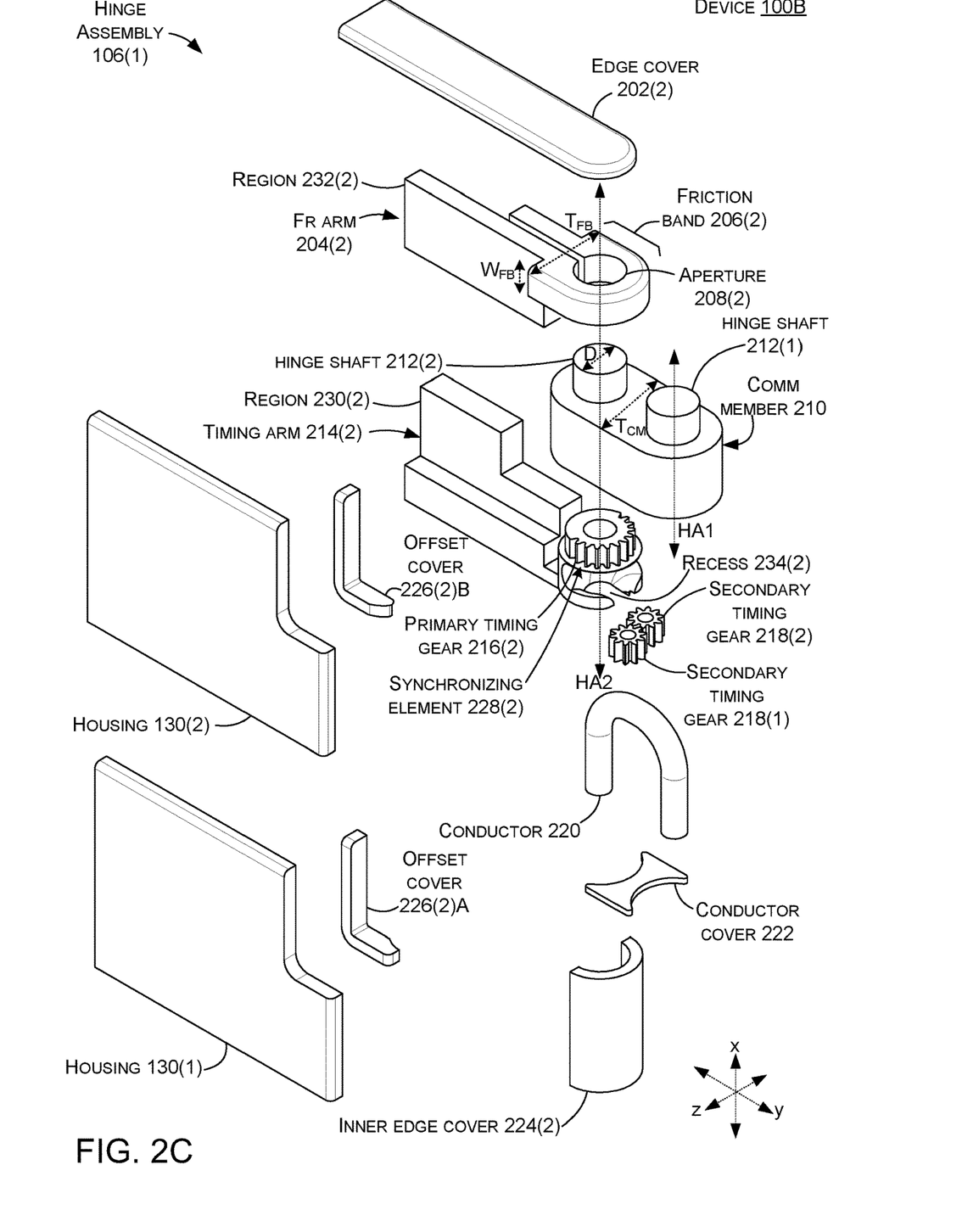
FIGS. 2C, 2D, and 3B-3D show exploded perspective views of example devices in accordance with some implementations of the present concepts.
Figure 2D:
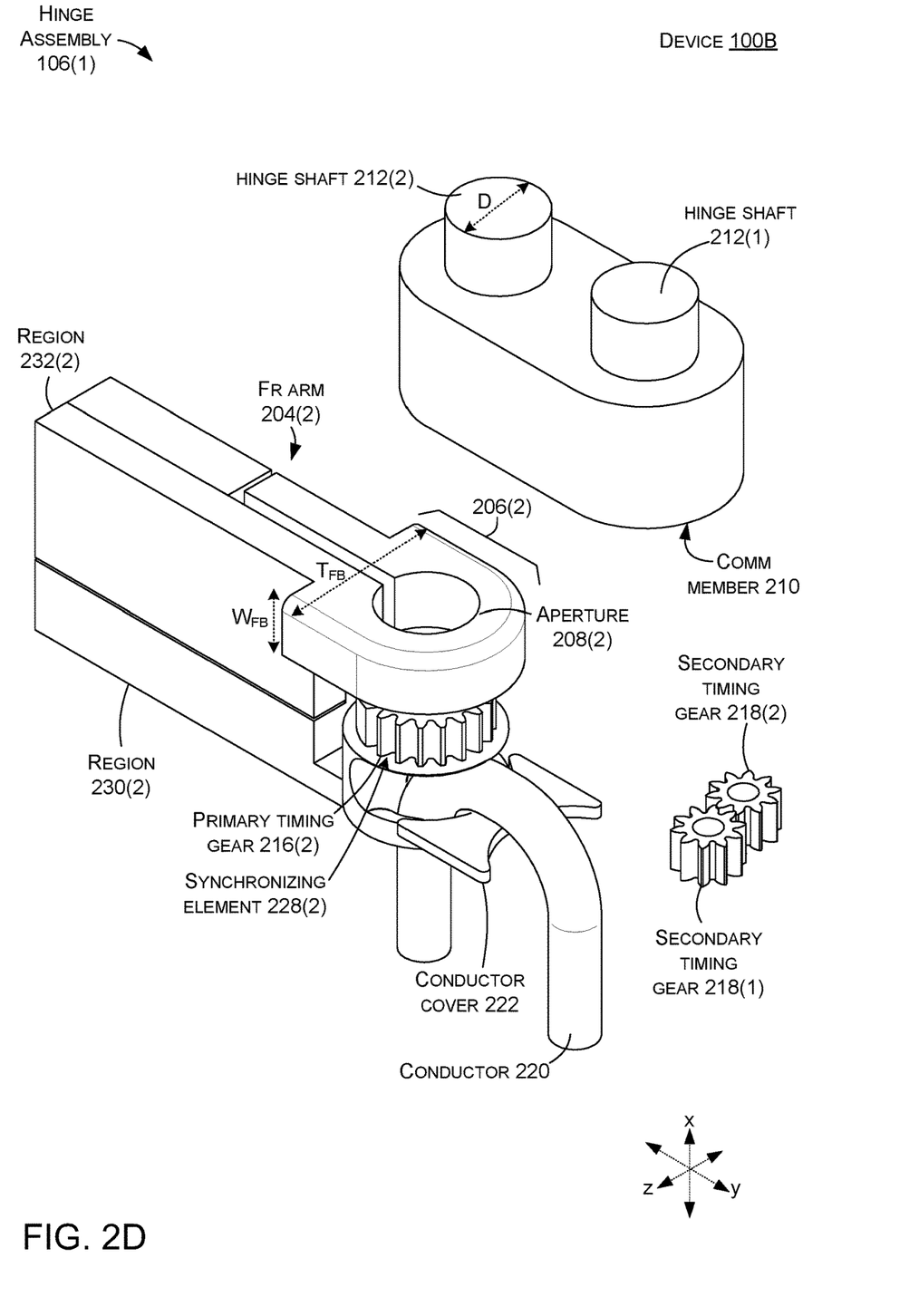
Figure 2E:
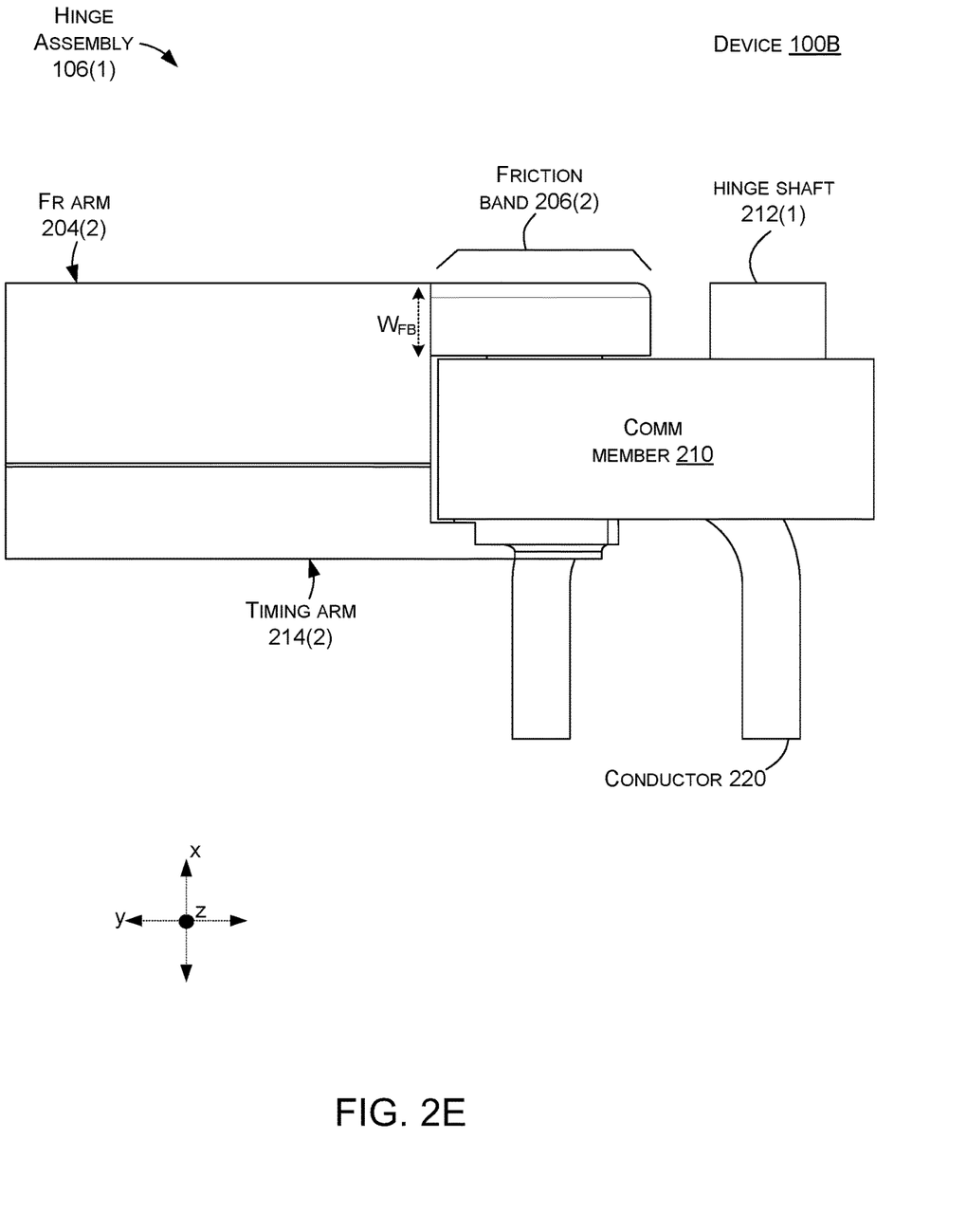
FIGS. 2E and 3E show elevational views of example devices in accordance with some implementations of the present concepts.
Figure 3A:
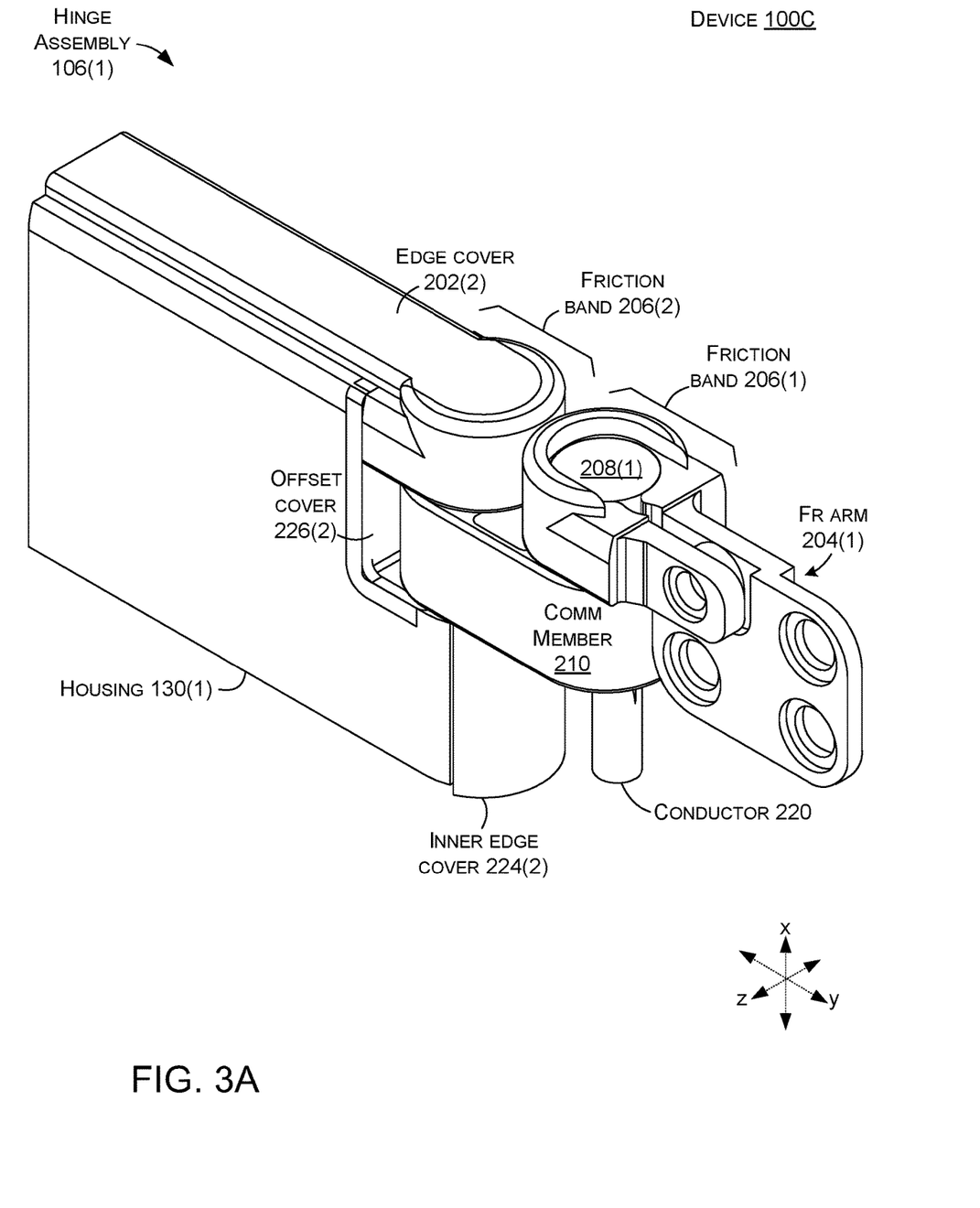
Figure 3B:
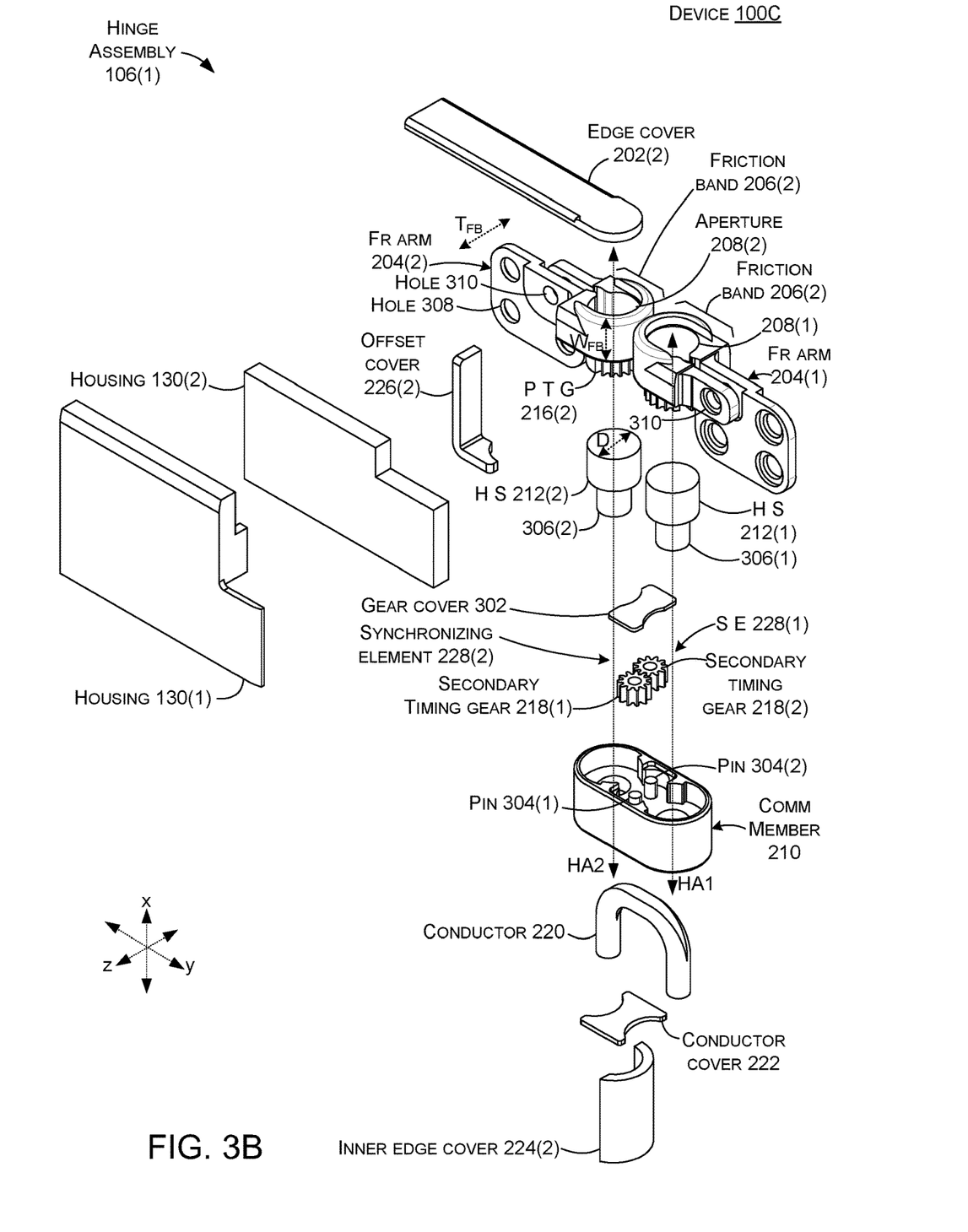
Figure 3C:
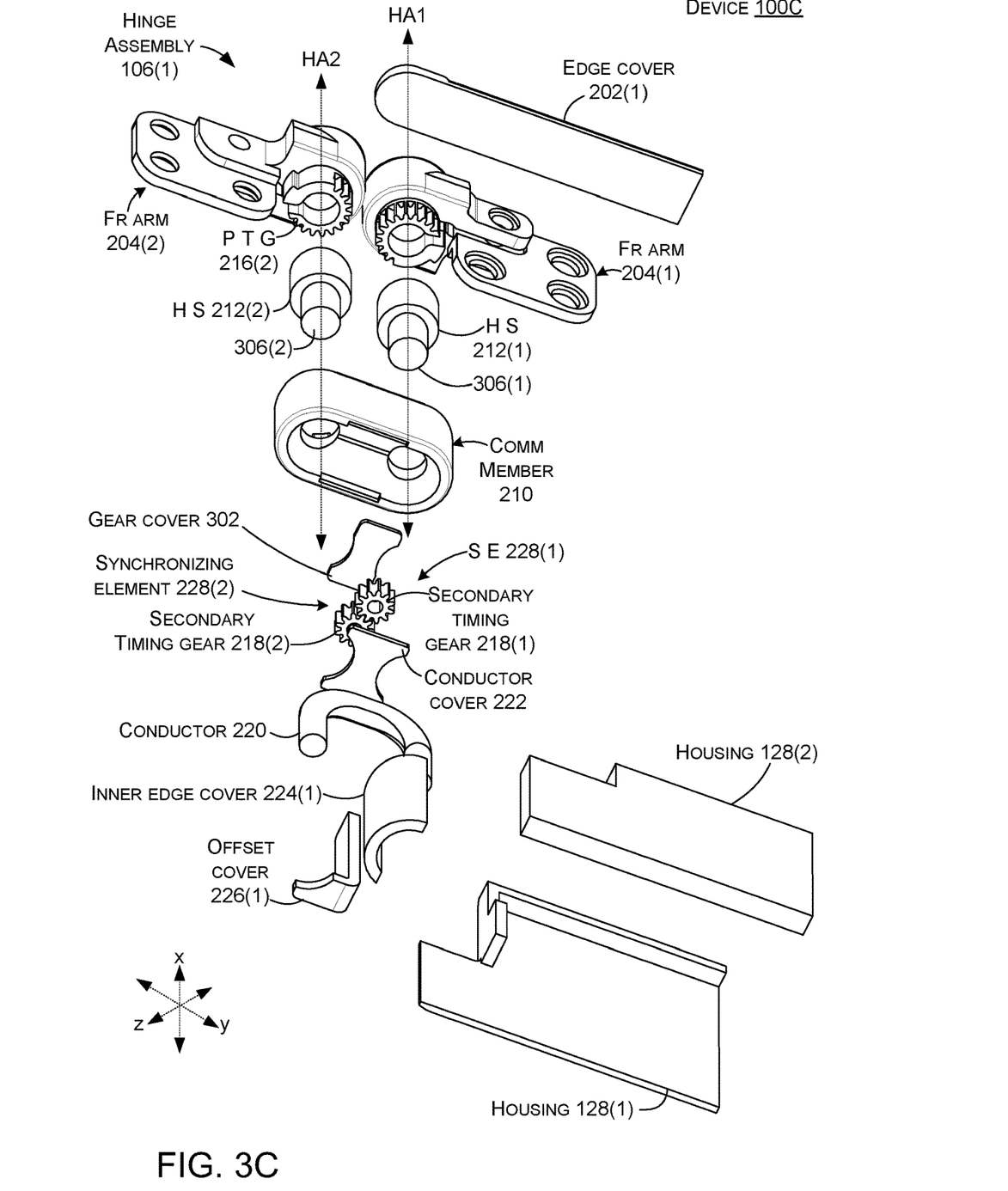
Figure 3D:
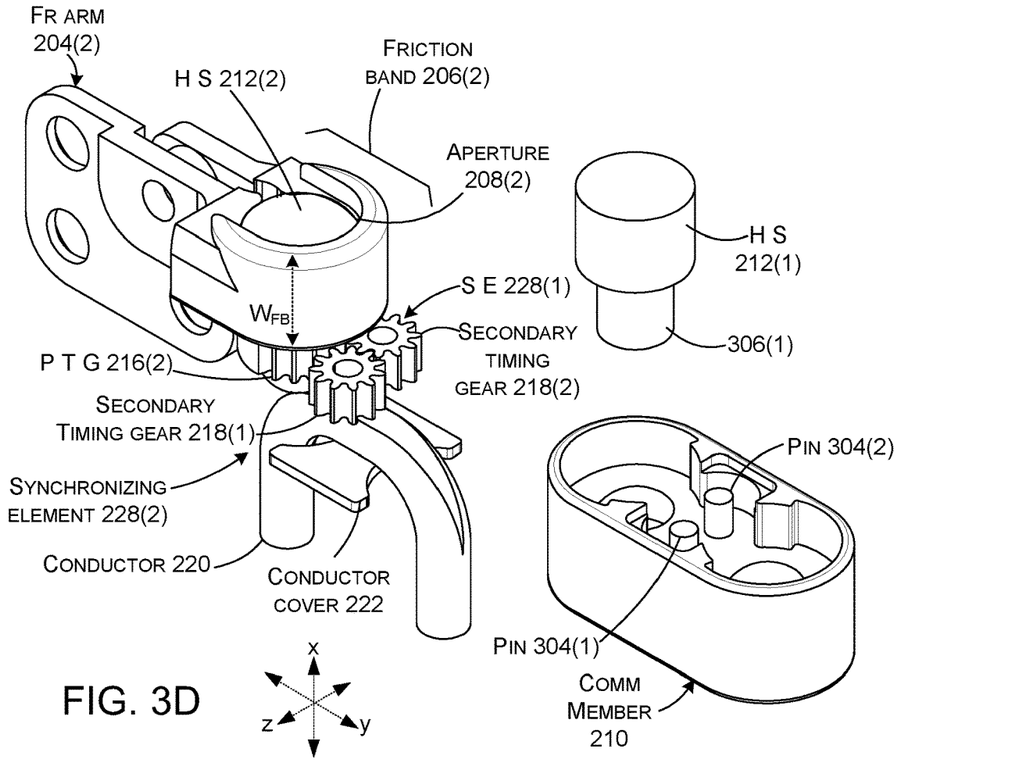
Figure 3E:
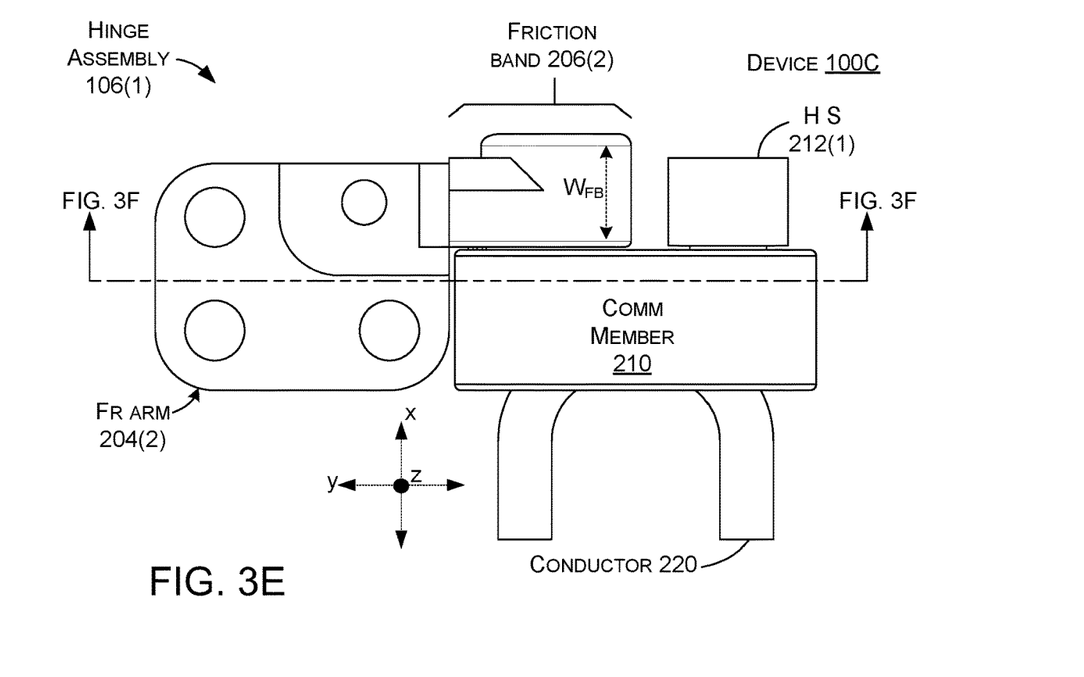
Figure 3F:
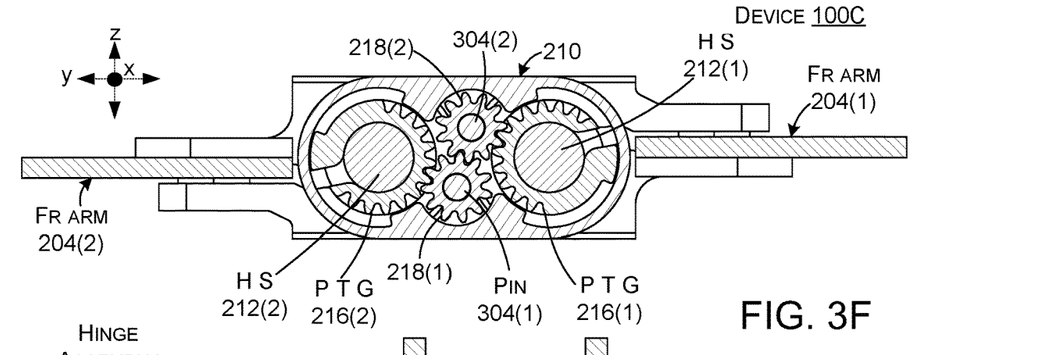
FIGS. 3F-3H show sectional views of example devices in accordance with some implementations of the present concepts.
Figure 3G:
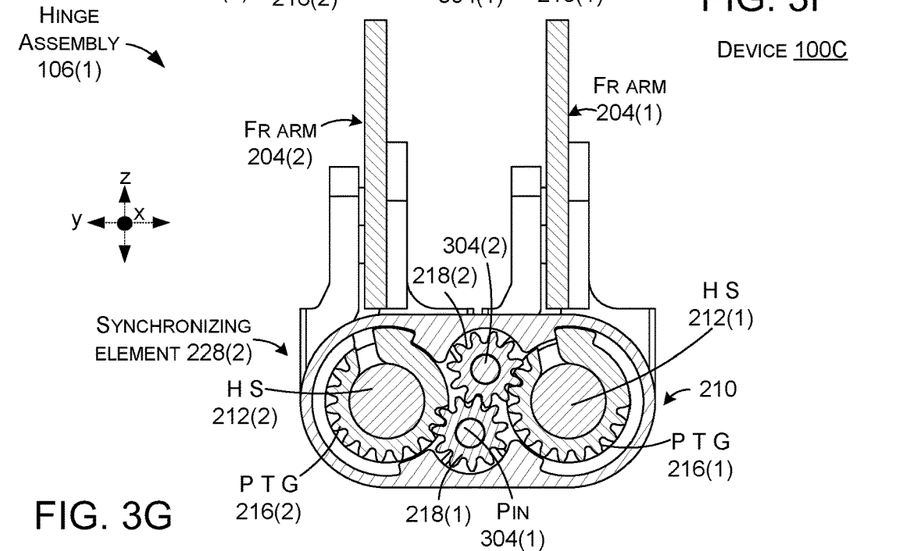
Figure 3H:
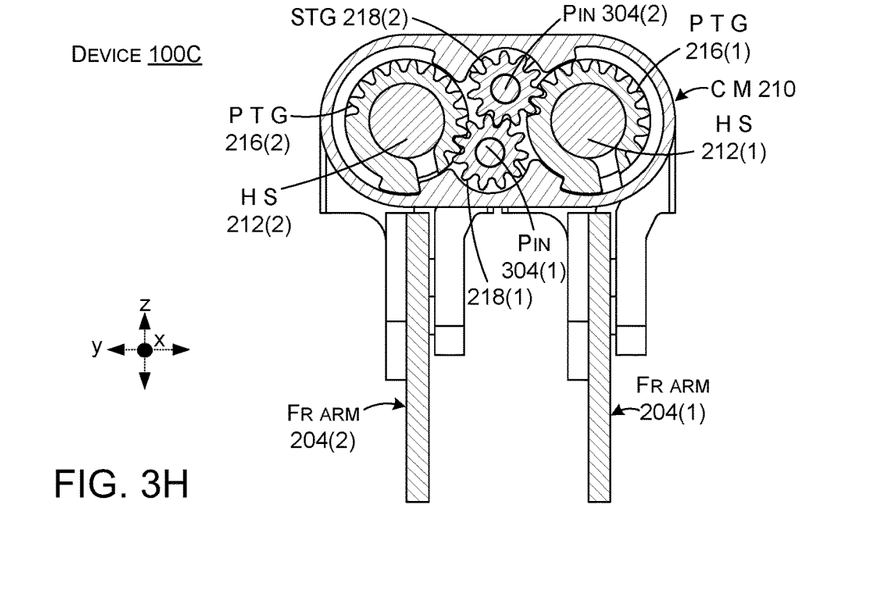

FIGS. 2A-2E collectively show details of example device 100B including hinge assembly 106(1). FIG. 2A is a perspective view from 'above' the hinge assembly and FIG. 2B is a similar partially transparent or 'ghosted' perspective view of the hinge assembly. FIGS. 2C and 2D are exploded perspective views of the hinge assembly. FIG. 2E is an elevational view of the hinge assembly.

In this case, as shown in FIG. 2C the hinge assembly 106(1) includes edge covers 202, friction arms 204, which define friction bands 206 that fold back on themselves (e.g., hairpin shape) to define apertures 208, a communication member 210, hinge shafts 212, timing arms 214, that define primary timing gears 216, secondary timing gears 218, conductor 220, conductor covers 222, inner edge covers 224, and/or offset covers 226 (two per side distinguished with 'A' and B' suffixes). The primary gears 216 intermesh or otherwise interact with the secondary gears 218 to function as timing or synchronizing elements 228 to provide a timed or synchronized relationship between the first and second portions.

In this implementation, the communication member 210 defines the hinge shafts 212 on its external or distal side (e.g., the hinge shafts 212 are toward the edge of the device relative to the communication member 210). The hinge shafts 212 can be parallel to one another and a fixed distance apart. The communication member 210 can have a thickness $T_{CM}$ that equals the device thickness T.

In this case, as shown in FIG. 2A, displays 126 are corner 'notched' around the hinge assembly 106. As such, there is a main bezel $W_{B1}$ and a local bezel $W_{B2}$ proximate to and in part defined by the hinge assembly (e.g., the communication member 210 and the friction bands 206). In this implementation, the hinge shafts 212 are distal to the displays 126 (FIG. 1) and can be located in the bezel width $W_{B1}$. Similarly, the friction bands 206 can have a width $W_{FB}$ when measured parallel to the hinge axes that is less than the bezel width $W_{B1}$. Thus, the friction bands 206 can occupy a small amount of device real estate in the x reference direction (e.g., along the hinge axes) and can be located in the bezel without extending under the displays. Further, the relatively small width $W_{FB}$ and relatively high friction per unit width can contribute to a reduced localized bezel $W_{B2}$. Stated another way, the relatively high friction per unit length of hinge shaft can allow the collective width of the friction bands 206 and the communication member 210 to be relatively smaller than other designs and thus the local bezel can be relatively smaller than other designs.

The hinge shafts 212 can have an outside diameter D that is friction fit into apertures 208 defined by the friction bands 206. Further, the friction bands 206 overlay the hinge shafts 212 and can have a thickness $T_{FB}$ equivalent to a device thickness T and the communication member thickness $T_{CM}$. Stated another way, the friction bands 206 can be exposed cosmetic elements that are not covered by another element (e.g., are visible to the user). As such, the hinge shafts 212 and the friction bands 206 can occupy the entirety of the device thickness T. This can allow relatively large diameter D hinge shafts 212 as a percentage of device thickness (e.g., portion thickness T of FIG. 1) compared to other designs where the friction bands are covered by other elements, such as cosmetic covering or the displays 126. The relatively large diameter hinge shafts 212 can provide relatively higher friction for a given amount of x dimension real estate than smaller diameter hinge shafts. Thus, the present implementations can offer a technical solution of relatively higher amounts of friction while occupying small amounts of x dimension real estate. Further still, the x dimension real estate can be in the bezel rather than underlying the displays.

Stated another way, the relatively high friction per unit length of hinge shaft 212 achieved by the full thickness friction bands 206 can allow shorter hinge shafts to be deployed. The shorter hinge shafts contribute to decreasing the combined width of the friction bands 206 and communication member 210, which in turn allows for a reduced local bezel $W_{B2}$ shown in FIG. 2A.

As shown in FIGS. 2B and 2C, in this implementation, the timing arms 214 are positioned proximally (e.g., toward the center of the device along the hinge axes (x reference direction)) relative to the communication member 210. The friction arms 204 are positioned distally (e.g., toward the edges of the device along the hinge axes (x reference direction)) relative to the communication member 210. Further, the timing arms 214 and the friction arms 204 engage one another to capture the communication member 210 and its hinge shafts 212 from opposite sides in a sandwich or laminate configuration. This design is more robust than a single point of support because it avoids cantilever issues that can be susceptible to breakage, such as during a dropping event.

In this case, the timing arms 214 and the friction arms 204 overlap and interlock to further strengthen the sandwich configuration of the hinge shafts 212. Specifically, in this case, regions 230 of timing arms 214 overlap with regions 232 of friction arms 204. The housings 128 or 130 can then be secured to both timing arms 214 and the friction arms 204 to further strengthen the hinge assembly. For example, housing 128(1) and 128(2) can be secured to timing arm 214(1) and friction arm 204(1) to eliminate relative movement between them. Note, FIG. 2A shows the housing 130(2) relative to first surface 122. The housing on the second surface 124 is not visible. FIG. 2C shows housings 130(1) and 130(2). Housings 128(1) and 128(2) have been removed to avoid clutter on the drawing page.

FIG. 2B shows the timing arms 214 and the friction arms 204 can be configured with a relatively narrow thickness as measured in the z reference direction so that the displays (126, FIG. 1) can extend over the timing arms and the friction arms in the x-reference direction. However, the friction bands 206 are too thick in the z reference direction to fit under the displays and thus are instead located in the bezels. It is noteworthy that the friction bands 206 provide a relatively high amount of friction per unit length in the x reference direction and thus, do not require the width of the bezel to be increased to accommodate a width $W_{FB}$ of the friction bands 206. Stated another way, relatively high rotational friction can be accomplished in a relatively small amount of bezel real estate so that display coverage can be maximized.

The conductor 220 can pass through recesses 234 in the timing arms 214 and be retained in the communication member 210 by conductor cover 222. The housings 128 and 130 can be fixedly secured to the interlocking timing arms 214 and friction arms 204 (e.g., the interlocking timing arms 214 and friction arms 204 can be sandwiched between the housing 128(1) and 128(2) or 130(1) and 130(2)). Fixedly secured as used above means that there is no relative movement.

The inner edge covers 224 can seal the internal space defined by the housings 128 and 130 from external contamination between the two hinge assemblies 106. The offset covers 226 can seal the internal space of the device portions proximate to the communication member 210. The edge covers 202 can seal the outside edge of the housing starting at the hinge shafts 212 and extending away from the hinge assemblies 106.

As mentioned above, the timing arms 214 can define primary timing gears 216. The primary timing gears 216 engage secondary timing gears 218, which themselves engage one another. The primary timing gears 216 and the secondary timing gears 218 can be received through a central side of the communication member 210 and can rotate around internal shafts (not shown) defined by the communication member 210. The combination of the primary timing gears 216 and the secondary timing gears 218 can function as synchronizing elements 228 to synchronize simultaneous and equivalent rotation (e.g., extent of rotation) of the timing arms 214 and hence the first and second portions 102 and 104 (FIG. 1) around the first and second hinge axes HA1 and HA2, respectively. For instance, the combination of the primary timing gears 216 and the secondary timing gears 218 can ensure that 20 degrees of rotation of the first portion 102 around the first hinge axis HA1 simultaneously produces 20 degrees of rotation of the second portion 104 around the second hinge axis HA2. Other types of synchronizing elements 228 are contemplated.

FIGS. 3A-3H collectively show another example device 100C that can include hinge assembly 106(1). Many of the elements of device 100C are similar to those described above relative to FIGS. 2A-2E and are not reintroduced here for sake of brevity. This implementation adds a gear cover 302. Also, the communication member 210 defines pins 304 that secondary timing gears 218 are positioned on and rotate around. Further, hinge shafts 212 include lower narrower regions 306 around which the primary timing gears 216 can rotate.

In this case, the friction arms 204 can be fixedly secured to the housing 128, 130 via fasteners (not shown) passing through holes 308 in the friction arms 204. Also, apertures 208 (e.g., the inside dimensions of the friction bands 206) can be adjusted via fasteners (not shown) passing through holes 310 in one side of the friction arms 204 and threaded into the other side of the friction arms. Tightening the fastener can squeeze the friction band 206 and decrease the apertures 208. Decreasing the apertures can increase friction between the friction arms 204 and the hinge shafts 212. Loosening the fasteners can increase the apertures 208 and decrease the friction.

In this implementation, the friction bands 206 can have a thickness $T_{FB}$ that is equal to the device thickness T (see FIG. 1). This increased friction band thickness can allow the hinge shafts 212 to have a larger diameter D than would otherwise be possible for a given hinge band material thickness around the hinge shaft. The large diameter hinge shafts 212 can provide more friction per unit length than can be achieved with thinner hinge shafts. The large diameter hinge shafts can also increase the strength and robustness of the hinge assembly 106(1). For instance, the larger hinge shaft diameter can make the hinge assembly less likely to suffer a catastrophic failure if the device is accidentally dropped. Dedicating all available device thickness to the hinge shafts 212 and the friction bands 206 can be achieved by treating the friction bands as cosmetic elements that are visible (e.g., exposed) to the user on the exterior of the device because thickness is not occupied by cosmetic covers.

Individual elements of the hinge assemblies can be made from various materials, such as metals, plastics, and/or composites. These materials can be prepared in various ways, such as from formed sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-3H.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion having a first display surrounded by a first bezel and a second portion having a second display surrounded by a second bezel, and a hinge assembly rotatably securing the first and second portions, and the hinge assembly comprising a first exposed friction band that is secured to the first portion and is friction fit around a first hinge shaft, and a second exposed friction band that is secured to the second portion and is friction fit around a second hinge shaft, the first friction band and the first hinge shaft are located entirely within the first bezel and do not underly the first display, and the second friction band and the second hinge shaft are located entirely within the second bezel and do not underly the second display, and wherein a thickness of the first friction band equals a thickness of the first portion and a thickness of the second friction band equals a thickness of the second portion.

Another example can include any of the above and/or below examples where a width of the first friction band as measured parallel to the first hinge shaft is less than a width of the first bezel.

Another example can include any of the above and/or below examples where a width of the second friction band as measured parallel to the second hinge shaft is less than a width of the second bezel.

Another example can include any of the above and/or below examples where the device further comprises a communication member that defines the first hinge shaft and the second hinge shaft a fixed distance apart and extending toward an edge of the device, and wherein the thickness of the first friction band and the thickness of the second friction band equal a thickness of the communication member.

Another example can include any of the above and/or below examples where the first hinge shaft and the second hinge shaft extend distally from the communication member to the edge of the device.

Another example can include any of the above and/or below examples further comprising a first timing arm secured to the first portion and a second timing arm secured to the second portion and wherein the first and second timing arms engage together in timed relation in the communication member to synchronize simultaneous and equivalent rotation of the first portion around the first hinge shaft and the second portion around the second hinge shaft, and wherein at least a portion of the first timing arm is positioned under the first display and wherein at least a portion of the second timing arm is positioned under the second display.

Another example can include any of the above and/or below examples where the device further comprises a first friction arm that includes the first friction band and a second friction arm that includes the second friction band and wherein the first friction arm and the first timing arm engage to capture the first hinge shaft and the communication member from opposing sides.

Another example can include any of the above and/or below examples where the second friction arm and the second timing arm engage to capture the second hinge shaft and the communication member from opposing sides.

Another example can include any of the above and/or below examples where the first friction arm and the first timing arm are fixed together to eliminate movement of one relative to the other.

Another example can include any of the above and/or below examples where the first friction arm and the first timing arm are both fixed to a device housing to eliminate movement of one relative to the other, and wherein the thickness of the first portion is measured through a first display positioned on the device housing.

Another example can include any of the above and/or below examples where the device further comprises a first friction arm that includes the first friction band and further defines a first synchronizing element and further comprising a second friction arm that includes the second friction band and further defines a second synchronizing element that in combination with the first synchronizing element causes simultaneous and equal rotation around the first hinge shaft and the second hinge shaft.

Another example can include any of the above and/or below examples where the first friction arm is fixedly secured to the first portion and the second friction arm is fixedly secured to the second portion.

Another example includes a device comprising a first portion that includes a first display and having a first thickness measured through the first display and a second portion that includes a second display and having a second thickness measured through the second display, and a hinge assembly rotatably securing the first and second portions, and the hinge assembly comprising a first friction band that is secured to the first portion and is friction fit around a first hinge shaft, and a second friction band that is secured to the second portion and is friction fit around a second hinge shaft, and wherein a thickness of the first friction band equals the first thickness and a thickness of the second friction band equals the second thickness.

Another example can include any of the above and/or below examples where the first and second friction bands are cosmetic elements that are visible on an exterior of the device.

Another example can include any of the above and/or below examples where the first portion comprises the first display that is surrounded by a first bezel and the first friction band is located in the first bezel adjacent to the first display and does not extend under the first display.

Another example can include any of the above and/or below examples where the second portion comprises the second display that is surrounded by a second bezel and the second friction band is located in the second bezel adjacent to the second display and does not extend under the second display.

Another example can include any of the above and/or below examples where the first hinge shaft and the second hinge shaft are defined by a communication member at a fixed distance apart.

Another example can include any of the above and/or below examples where the device further comprises a first timing arm that rotates relative to the communication member, and wherein the first timing arm comprises a first recess.

Another example can include any of the above and/or below examples where the device further comprises a second timing arm that rotates relative to the communication member, and wherein the second timing arm comprises a second recess, and further comprising a conductor extending from the first portion through the first recess into the communication member and through the second recess into the second portion.

Another example includes a device comprising a first portion having a first thickness and a second portion having a second thickness, a first friction arm fixedly secured to the first portion and comprising a first friction band and a first synchronizing element, the first friction band having a thickness that equals the first thickness, and a second friction arm fixedly secured to the second portion and comprising a second friction band and a second synchronizing element, the second friction band having a thickness that equals the second thickness, and the first synchronizing element interacting with the second synchronizing element to synchronize rotation of the first and second portions.

The invention claimed is:

1. A device, comprising:
a first portion having a first display surrounded by a first bezel and a second portion having a second display surrounded by a second bezel; and,
a hinge assembly defining a communication member and first and second hinge shafts that extend distally from the communication member, the first hinge shaft is coincident with a first hinge axis around which the first portion rotates and the second hinge shaft is coincident with a second hinge axis around which the second portion rotates, the communication member associated with a first timing arm that is positioned centrally relative to the communication member and that defines a first timing gear, and the communication member associated with a second timing arm that is positioned centrally relative to the communication member and that defines a second timing gear that interacts with the first timing gear to synchronize rotation of the first and second portions; and,
the hinge assembly comprising a first friction arm that defines a first exposed friction band that is secured to the first portion and is friction fit around the first hinge shaft and wherein the communication member is captive between the first friction arm and the first timing arm, and a second friction arm that defines a second exposed friction band that is secured to the second portion and is friction fit around the second hinge shaft and wherein the communication member is captive between the second friction arm and the second timing arm, the first exposed friction band and the first hinge shaft are located entirely within the first bezel and do not underly the first display, and the second exposed friction band and the second hinge shaft are located within the second bezel and do not underly the second display, and wherein a thickness of the first exposed friction band equals a thickness of the first portion and a thickness of the second exposed friction band equals a thickness of the second portion.

2. The device of claim 1, wherein a width of the first exposed friction band as measured parallel to the first hinge shaft is less than a width of the first bezel.

3. The device of claim 2, wherein a width of the second exposed friction band as measured parallel to the second hinge shaft is less than a width of the second bezel.

4. The device of claim 1, wherein the thickness of the first exposed friction band and the thickness of the second exposed friction band equal a thickness of the communication member.

* * * * *